Figure 1:
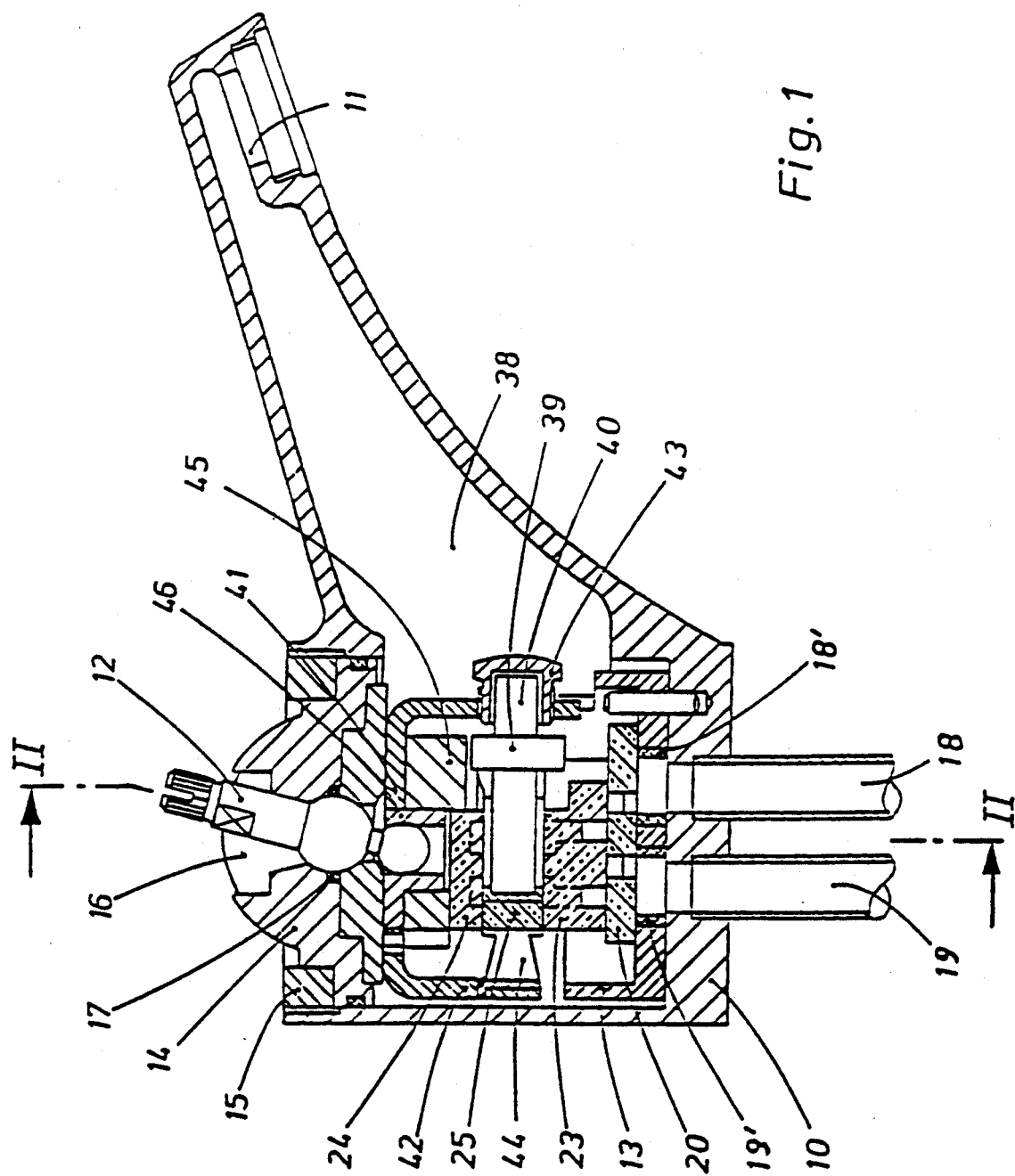

United States Patent [19]

Bergmann

[11] Patent Number: 5,110,044
[45] Date of Patent: May 5, 1992

[54] SANITARY MIXING VALVE

[75] Inventor: Konrad Bergmann, Wittlich, Fed. Rep. of Germany

[73] Assignee: Ideal Standard GmbH, Bonn, Fed. Rep. of Germany

[21] Appl. No.: 623,383

[22] PCT Filed: May 19, 1989

[86] PCT No.: PCT/EP89/00548
§ 371 Date: Nov. 16, 1990
§ 102(e) Date: Nov. 16, 1990

[87] PCT Pub. No.: WO89/11690
PCT Pub. Date: Nov. 30, 1989

[30] Foreign Application Priority Data

May 20, 1988 [DE] Fed. Rep. of Germany ....... 3817277

[51] Int. Cl.5 ............................................ G05D 23/13
[52] U.S. Cl. .................................. 236/12.16; 236/12.23
[58] Field of Search ................. 236/12.16, 12.17, 12.23

[56] References Cited

U.S. PATENT DOCUMENTS

| 4,349,149 | 9/1982 | Humpert | 236/12.16 |
| 4,381,073 | 4/1983 | Gloor | 137/606 |
| 4,407,444 | 10/1983 | Knebel et al. | 236/12.1 |
| 4,674,678 | 6/1987 | Knebel et al. | 236/12.16 X |
| 4,700,885 | 10/1987 | Knebel | 236/12.16 |
| 4,738,393 | 4/1988 | Bergmann et al. | 236/12.16 |
| 4,819,867 | 4/1989 | Delpla et al. | 236/12.16 |

Primary Examiner—William E. Tapolcai
Attorney, Agent, or Firm—Blum Kaplan

[57] ABSTRACT

A sanitary mixing valve for controlling the flow and mix of hot and cold water supplied respectively from a hot water inlet and a cold water inlet. The valve includes a valve body coupleable to the hot and cold water inlets and having a water outlet. A disk packet is supported on the valve body and includes a control disk. The control disk includes a mixing chamber for receiving a mix of the hot and cold water. A temperature-dependent control element is positioned on the control disk to directly measure the temperature of the mixed water in the mixing chamber. The temperature of the water emerging from the water outlet is regulated according to the measured temperature.

21 Claims, 4 Drawing Sheets

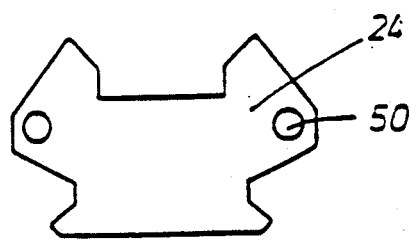
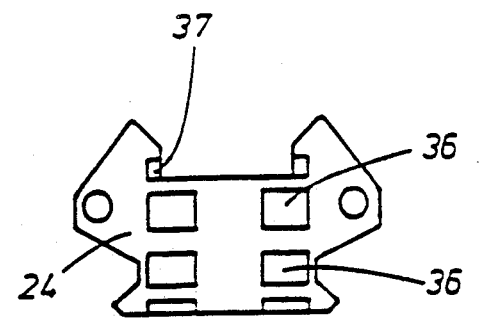
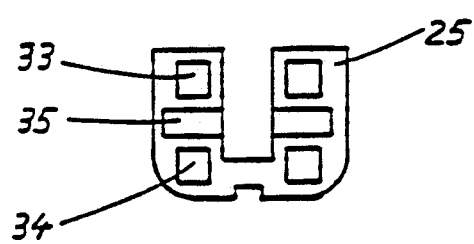
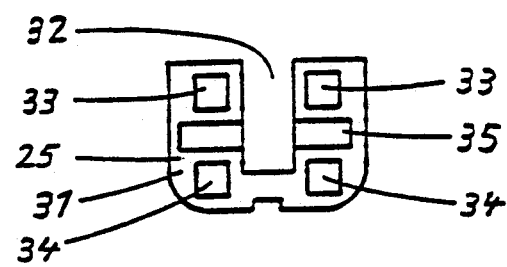
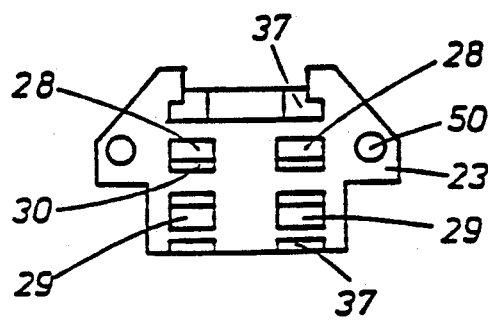
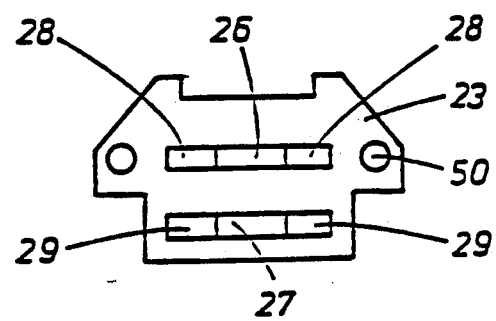
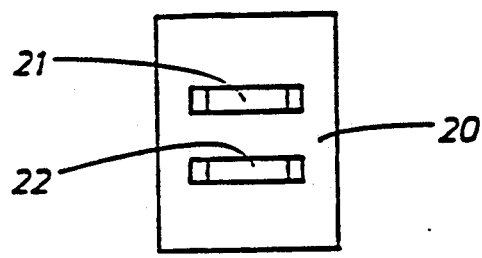
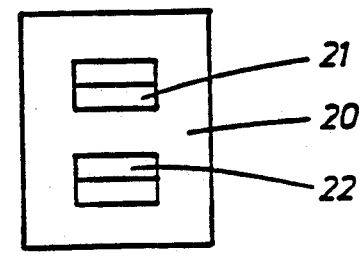
Fig.3a   Fig.3b

SANITARY MIXING VALVE

The invention refers to a sanitary mixing valve with thermostatic regulation, with an actuation element, with a stationary valve seat disc, with a disc packet displaceable on the valve seat disc to control the flow and with a temperature-dependent control element, wherein the valve seat disc has a cold water inlet port and a hot water inlet port, wherein the disc packet consists of a lower guide disc, an upper guide disc and a control disc which is provided between the lower guide disc and the upper guide disc, wherein the lower guide disc and the control disc have passages communicating with the cold water inlet port and the hot water inlet port of the valve seat disc, and the upper guide disc has pressure compensation chambers communicating with the passages of the control disc, and wherein the control disc can be set for the purpose of temperature control by means of the actuation element relative to the guide discs to a starting position which determines temperature and, for the purpose of temperature regulation, can be controlled by means of the temperature-dependent control element.

In the known sanitary mixing valve, on which this invention is based (cf. DE-OS 35 25 052), the temperature-dependent control element is located essentially outside the disc packet which effects flow and temperature control and regulation in the water chamber for the emerging mixed water, although it acts on the spring-loaded control disc located between the guide discs of the disc packet and forms a functional and structural unit with the disc packet. This goes to prove that the temperature control via the temperature-dependent control element is relatively slow.

The object underlying this invention, is therefore to improve the known sanitary mixing valve, on which this invention is based, in such a way that the control disc is more quickly and sensitively controlled via the temperature-dependent control element so that the preset mixed water temperature is kept constant without perceptible fluctuations.

The sanitary mixing valve according to this invention, in which valve the object deduced and explained above is achieved, is characterized in that in the control disc at least one mixing chamber is provided which communicates with the passages of the lower guide disc and/or with the pressure compensation chambers of the upper guide disc and in that the temperature-dependent control element is located in the mixing chamber of the control disc and/or in a cavity of the control disc which cavity communicated with the mixing chamber and in that partial flows of the cold water and the warm water enter into the mixing chamber and the mixed water flows around the control element. Preferably, one mixing chamber communicating with the passages of the lower guide disc and one mixing chamber communicates with the pressure compensation chambers of the upper guide disc are provided in the control disc, the two mixing chambers lead into a cavity of the control disc and the temperature-dependent control element is placed in the mixing chambers and/or in the cavity of the control disc.

In the sanitary mixing valve according to this invention at least a partial flow of the cold and hot water is mixed in the control disc itself and the mixed water is directly brought to the temperature-dependent control element over a short path so that in the case of deviations of the mixed water temperature from the preset mixed water temperature, a control of the control disc relative to the two guide discs is immediately effected, initiated by the control element.

Figure 1A:
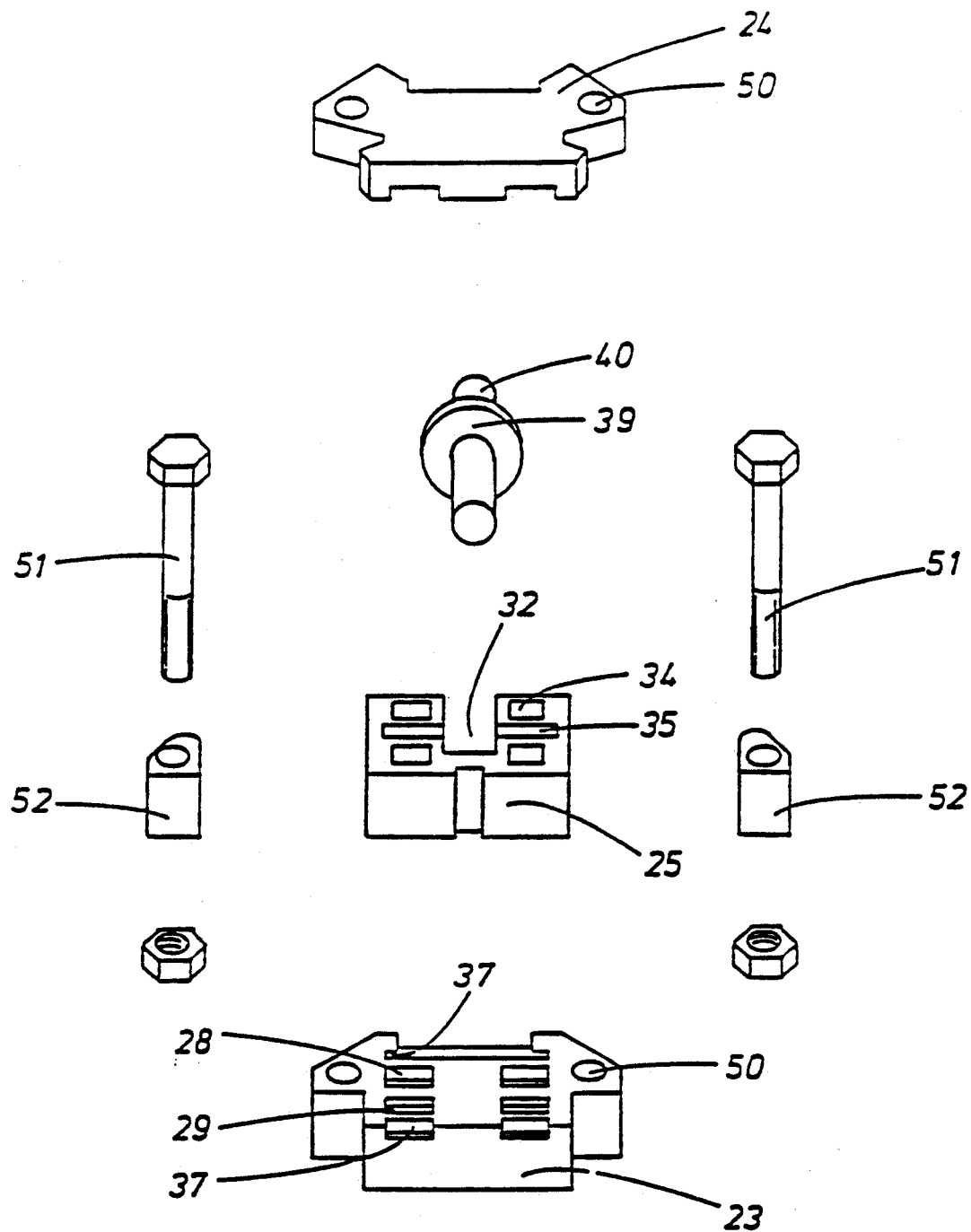
Figure 1A:
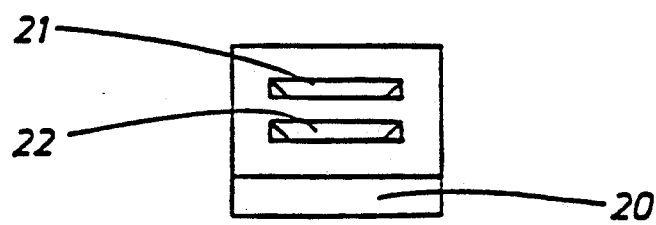
Figure 2:
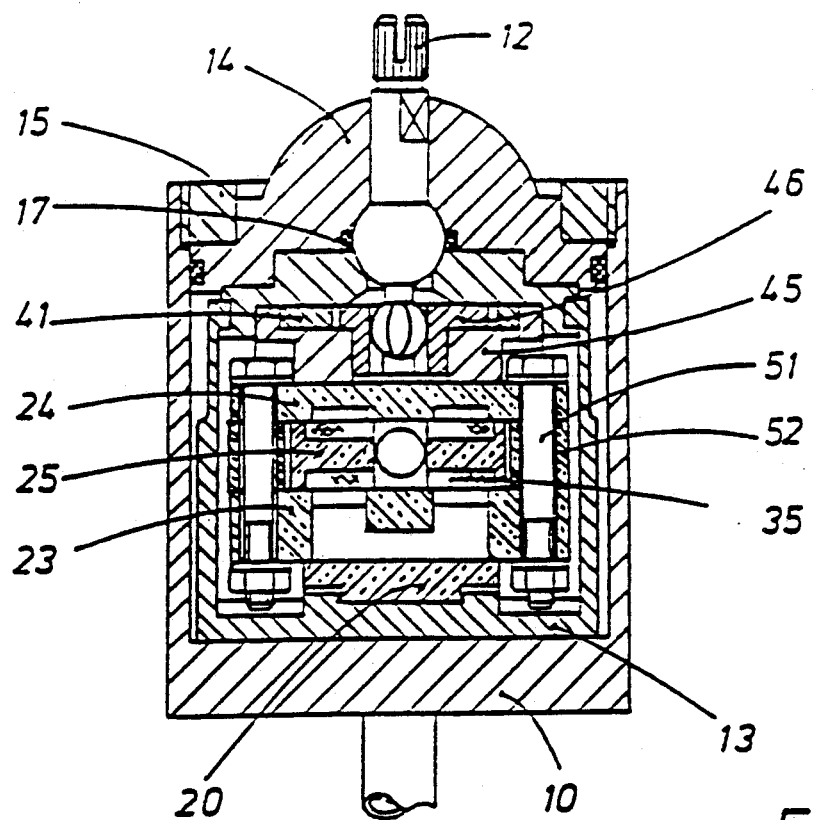
Figure 4:
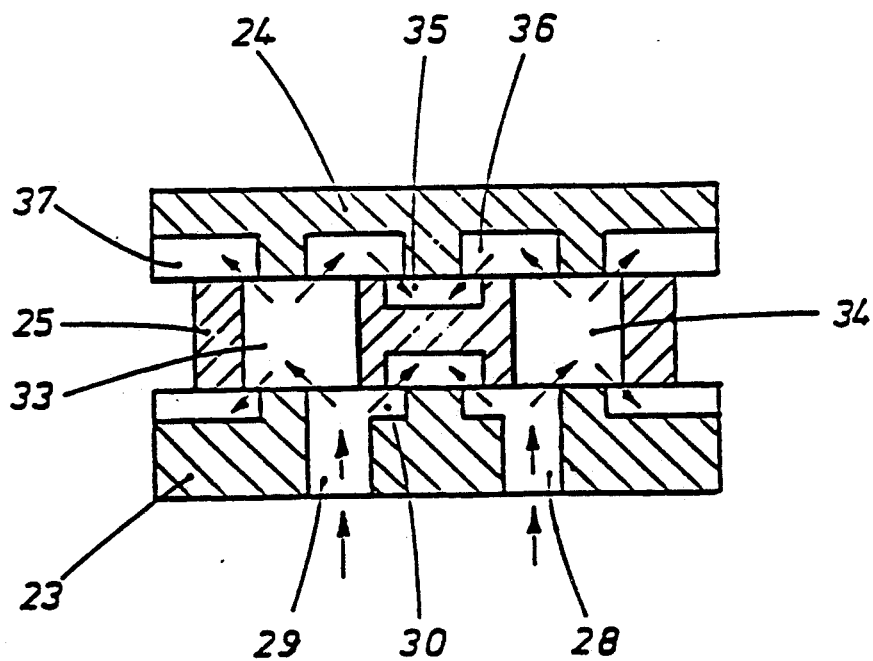

In the following, the invention and advantages achieved by the invention are explained in connection with an exemplary embodiment reproduced in the drawing: the drawing shows in:

FIG. 1 a longitudinal section through a preferred embodiment of a sanitary mixing valve according to the invention, FIG. 1a is an exploded drawing, the sanitary valve seat disc, the lower guide disc, the control disc, the temperature-dependent control element and the upper guide disc of the sanitary mixing valve according to FIG. 1, FIG. 2 a section through the sanitary mixing valve according to FIG. 1 along line II—II, FIG. 3a the valve seat disc, the lower guide disc, the control disc and the upper guide disc of the sanitary mixing valve according to FIG. 1, each being seen from above and the control disc being slightly changed in comparison with the representation in FIG. 1a, FIG. 3b the valve seat disc, the lower guide disc, the control disc and the upper guide disc, all of which are represented from above in FIG. 3a, now each being seen from below, and FIG. 4 schematically the disc packet with the realized water pathways, which packet consists of the lower guide disc, the control disc and the upper guide disc.

To begin with, the sanitary mixing valve depicted in FIGS. 1 and 2 has a valve body 10 with a water outlet 11 and an actuation element with an actuation lever 12 and an actuation handle (not shown) mountable on the actuation lever 12. A cartridge housing 13 is inserted in the valve body 10. Above the cartridge housing 13 is a valve body cover 14 which is secured in the valve body 10 by means of a retaining ring 15. The valve body cover 14 has an actuation opening 16 through which the actuation lever 12 passes. An O-ring 17 is provided at the foot of the actuation opening 16 so that the actuation lever can be moved in a sealed manner. A hot water inlet 18 and a cold water inlet 19 are attached on the bottom of the valve body 10. Passages in the bottom of the cartridge housing 13 corresponding to the passages in the bottom of the valve body 10 which receive the hot water inlet 18 and the cold water inlet 19. Seals 18' and 19' are inserted into the passages provided in the bottom of the cartridge housing 13.

Secured to the bottom of the cartridge housing 13 is first a valve seat disc 20 with a hot water inlet port 21 and a cold water inlet port 22. A disc packet is placed on the valve seat disc 20, which disc packet is displaceable as a whole with respect to the valve seat disc 20 by means of the actuation element, i.e. by means of the actuation lever 12, for the purpose of flow control. The disc packet consists of a lower guide disc 23, an upper guide disc 24 and a control disc 25 placed between the lower guide disc 23 and the upper guide disc 24. The lower guide disc 23 has passages 28, 29 which communicate with the hot water inlet port 21 and the cold water inlet port 22 of the valve seat disc 20 and to which in the control disc 25 passages 33, 34 are associated so that the passages 33, 34 of the control disc 25—depending on the position of the disc packet with respect to the valve seat disc 20—can also communicate with the hot water inlet port 21 and the cold water inlet port 22 in the valve seat disc 20. Furthermore, the upper guide disc 24 has pressure consumption chambers 36 which are associated to the passages 33, 34 of the control disc 25. The pressure compensation chambers 36 of the upper guide disc 24 can—depending on the position of the control disc—communicate with the passages 33, 34 of the control disc 25 and the passages 28, 29 of the lower guide disc 23, and—depending on the position of the disc packet with respect to the valve seat disc 20—with the hot water inlet port 21 and the cold water inlet port 22 in the valve seat disc 20. Finally, a temperature-dependent control element 39 is provided as a further structural element necessary for operation.

As already explained, the control disc 25 can be set for the purpose of temperature control by means of the actuation element, i.e. by means of the actuation lever 12, relative to the guide discs 23, 24 to a starting position which determines temperature. In addition, the control disc 25 can be controlled by means of the temperature-dependent control element 39 relative to the guide discs 23, 24 for the purpose of temperature regulation.

Hence, both flow control and temperature control and regulation are effected in the sanitary mixing valve in question. The flow control is effected by a linear displacement of the whole disc packet relative to the valve disc 20, namely by means of the actuation element and thus by means of the actuation lever 12. The temperature control is also effected by a linear displacement, namely by a displacement of the control disc 25 relative to the guide discs 23, 24, again by means of the actuation element and thus by means of the actuation lever 12. Finally, the temperature regulation is also effected by a linear displacement, namely as in the case of the temperature control by a linear displacement of the control disc 25 relative to the guide disc 23, 24, however, by means of the temperature-dependent control element 39.

According to the invention, at least one mixing chamber communicating with the passages of the lower guide disc and/or with the pressure compensation chambers of the upper guide disc is provided in the control disc and the temperature-dependent control element is located in the mixing chamber of the control disc and/or in a cavity of the control disc communicating with the mixing chamber. In the case of the represented exemplary embodiment, as in particular FIGS. 1, 1a, 3a and 3b show, a mixing chamber 35 communicating with the passages 28, 29 of the lower guide disc 23 and a mixing chamber 35 communicating with the pressure compensation chambers 36 of the upper guide disc 24 are provided in the control disc 25, the two mixing chambers 35 lead into a cavity 36 of the control disc 25 and the temperature-dependent control element 39 is located in the cavity 32 of the control disc 25. As for the rest, a textile material which is indicated in FIG. 2 only, is inserted in the mixing chambers 35 which serves to better mix the cold and hot water on the one hand, and leads to a noise reduction on the other.

In the represented exemplary embodiment, the lower guide disc 23 and the control disc 25 each have four passages numbered 28/29 and 33/34 respectively, and each group of two passages 28 and 29 of the lower guide disc 23 communicate with the hot water inlet port 21 and the cold water inlet port 22 of the valve seat disc 20, respectively. In particular, the lower guide disc 23 has, on the side facing the valve seat disc 20, inlet slits 26, 27 associated to the hot water inlet port 21 and the cold water intel port 22 of the valve seat disc 20, and from the outer ends of each inlet slit 26, 27 emerges a passage 28, 29 respectively (cf. FIG. 3b). The passages 28, 29 of the lower guide disc 23 have, on the side facing the control disc 25, enlargements 30 (cf. FIG. 3a) which communicate with the lower mixing chambers 35 of the control disc 25. In the represented exemplary embodiment the lower guide disc 23 and the control disc 25 each have four passages 28/29 and 33/34. Therefore, the upper guide disc 24 has, on the side facing the control disc 25, four pressure compensation chambers 36, namely pressure consumption chambers 36 which are associated to the four passages 33, 34 of the control disc 25 (cf. FIG. 3b).

Furthermore, in the represented exemplary embodiment of a sanitary mixing valve according to the invention, the lower guide disc 23 and the upper guide disc 24 each have, on the sides facing the control disc 25—further—pressure compensation chambers 37 for partial flows of the cold and hot water, and the pressure compensation chambers 37 are provided on the outer delimiting edges of the lower guide disc 23 and the upper guide disc 24 and are open to the outside.

In the represented exemplary embodiment, the temperature-dependent control element 39, as particularly FIGS. 1 and 1a show, is cylindrical in shape and has a piston 40, and the control disc 25, as FIGS. 1a, 3a and 3b show, is U-shaped, with the arms 31 of the U bordering the cavity 32 and the passages 33 and 34 as well as the mixing chambers 35 being formed in the arms 31 of the U.

It has initially been mentioned that in the sanitary mixing valve according to the invention the lower guide disc 23, the upper guide disc 24 and the control disc 25 form a disc packet. As is shown in FIG. 1a, the lower guide disc 23 and the upper guide disc 24 are clamped together—by means of bolts 51 penetrating passages 50 in the guide discs 23, 24—using interposing spacer sleeves 52, with the length of the spacer sleeves 52 ensuring the space between the lower guide disc 23 and the upper guide disc 24 which space is necessary for the displaceability of the control disc 25.

As regards the temperature-dependent control element 39, it is additionally to be pointed out that, as FIGS. 1 and 2 show, a shackle 41 overlapping the disc packet is provided, and clamped between the two arms 42, 43 of the shackle are a return spring 44, the control disc 25 and the temperature-dependent control element 39. In detail, the return spring 44 presses against the arm 42 of the shackle, the control disc 25 against the return spring 44 and the temperature-dependent control element 39 against the control disc 25 on the one hand and—with its piston 40—against the arm 43 of the shackle on the other, to be more precise against an adjustment screw provided at the arm 43 of the shackle. The shackle 41 can be displaced on a control cage 45 which forms a frictionally engaged unit with the disc packet. For this purpose, a control cam 46 of the actuation lever 12 engages in a corresponding recess in the shackle 41, with the control cam 46 of the actuation lever 12 having an eccentric element so that a rotary motion of the actuation lever 12 and thus a rotary motion of the control cam 46 is converted into a linear displacement of the shackle 41. The control cam 46 of the actuation lever 12 and the associated recess in the shackle 41 are such that a so-called "comfort zone" is produced, by means of which relatively large rotations of the actuation lever 12 result in only a small displacement of the shackle 41 and therefore in a small change in the temperature setting.

In the sanitary mixing valve according to the invention, a partial flow of the cold water and of the hot water is mixed in the control disc 25 itself, to be more precise in the mixing chambers 35, and the mixed water is directly brought to the temperature-dependent control element over a short path so that in the case of deviations of the mixed water temperature from the preset mixed water temperature, a control of the control disc 25 relative to the two guide discs 23, 24 is immediately effected, initiated by the control element 39.

In the represented exemplary embodiment of the sanitary mixing valve according to the invention the lower guide disc 23 and the upper guide disc 24 have, on the sides facing the control disc 25, pressure compensation chambers 37 for the partial flow of the cold and hot water, i.e. have pressure compensation chambers 37 which do not communicate with the mixing chambers 35 of the control disc 25. Thus, if the cross sections have the appropriate dimensions, it is possible to fix the ratio of the partial flow of the control and hot water which passes into the mixing chambers 35 of the control disc 25 to the partial flow of the cold and hot water which does not pass into the mixing chambers 35 of the control disc 25, and thus to determine the regulation characteristics. As for the rest, all partial flows of the cold and hot water naturally come together in the water chamber 38 of the sanitary mixing valve according to the invention. In the water chamber 38, all the supplied water is again mixed before it leaves the sanitary mixing valve via the water outlet 11.

Water flows through the sanitary mixing valve according to the invention as follows:

Pivoting movements of the actuation element and thus the actuation lever 12 in the plane of the water outlet 11 result in regulation of the quantity of water flowing through the mixing valve, by the fact that the disc packet is displaced on the valve seat disc 20 because of the frictional coupling with the control cam 46 of the actuation lever 12 effected by the control cage 45. In this process, the inlet slits 26, 27 of the lower guide disc 23 work together with the hot water inlet port 21 and the cold water inlet port 22 of the valve seat disc 20, so that a corresponding quantity of water can flow through the mixing valve depending on the position of the disc packet with respect to the valve seat disc 20.

Temperature control is effected by rotating the actuation element and thus by rotating the actuation lever 12, with the rotation of the actuation lever 12 being converted by the control cam 46 into a linear displacement of the shackle 41 and thus a linear displacement of the control disc 25 relative to the guide discs 23, 24. The relative position of the control disc 25 with respect to the guide discs 23 and 24 determines the mixed water temperature.

Partial flow of the cold and hot water enters into the mixing chambers 35 of the control disc 25 which face the guide discs 23, 24. From the mixing chambers 35, the mixed water flows around the temperature-dependent control element located in the control disc 25. The temperature-dependent control element 39 controls the position of the control disc 25 with respect to the guide discs 23, 24 by means of the piston 40 which responds to changes in temperature.

I claim:

1. A sanitary mixing valve for controlling the flow and mix of hot and cold water supplied respectively from a hot water inlet and a cold water inlet, comprising a valve body coupleable to said hot and cold water inlets and having a water outlet, a stationary valve seat disk supported on said valve body, disk packet means supported on said valve seat disk for controlling the flow and temperature of water emerging from said water outlet, said disk packet means including a lower guide disk, an upper guide disk and a control said lower guide disk having at least first and second passages in communication with said hot and cold water inlets through said stationary valve seat disk, said control disk having corresponding third and fourth passages selectively displaceable to communicate with the first and second passages in said lower guide disk, said upper guide disk having a corresponding first set of pressure compensation chambers in communication with said third and fourth passages in said control disk, said control disk including a first mixing chamber in communication with at least one of said third and fourth passages and said pressure compensation chambers for receiving a portion of the hot and cold water therein, and a temperature-dependent control means supported on said disk packet means and coupled to said control disk for directly receiving said mixture of water from said mixing chamber, for determining the temperature of the mixture of water in said mixing chamber upon receipt thereof and for selectively adjusting the position of said control disk to regulate the temperature of mixed water emerging from said water outlet at a predetermined temperature, said temperature-dependent control means being positioned in said first mixing chamber.

2. The sanitary mixing valve as claimed in claim 1, wherein said lower guide disk includes a second set of pressure compensation chambers, said first and second sets of pressure compensation chambers each receiving a portion of the hot and cold water from said hot and cold water inlets.

3. The sanitary mixing valve as claimed in claim 2, wherein said lower and upper guide disks each include an outer edge, each pressure compensation chamber in said first and second sets of pressure compensation chambers being positioned respectively on the outer edges of said lower and upper guide disks and being open to said valve body.

4. The sanitary mixing valve as claimed in claim 1, wherein said temperature-dependent control means includes a cylindrical shaped control element.

5. The sanitary mixing valve as claimed in claim 1, wherein said control disk is U-shaped.

6. The sanitary mixing valve as claimed in claim 5, wherein said temperature-dependent control means includes a cylindrical shaped control element.

7. The sanitary mixing valve as claimed in claim 1, wherein said disk packet means includes spacers means for spacing said lower and upper guide disks a sufficient amount apart to permit said control disk to be displaceable therebetween.

8. The sanitary mixing valve as claimed in claim 7, wherein said spacer means includes spacer sleeves interposed between said lower and upper guide disks.

9. A sanitary mixing valve for controlling the flow and mix of hot and cold water supplied respectively from a hot water inlet and a cold water inlet, comprising a valve body coupleable to said hot and cold water inlets and having a water outlet, a stationary valve seat disk supported on said valve body, disk packet means supported on said valve seat disk for controlling the flow and temperature of water emerging from said water outlet, said disk packet means including a lower guide disk, an upper guide disk and a control disk disposed intermediate said lower and upper guide disks, said lower guide disk having at least first and second passages in communication with said hot and cold water inlets through said stationary valve seat disk, said control disk having corresponding third and fourth passages selectively displaceable to communicate with the first and second passages in said lower guide disk, said upper guide disk having a corresponding first set of pressure compensation chambers in communication with said third and fourth passages in said control disk, said control disk including a first mixing chamber in communication with at least one of said third and fourth passages and said pressure compensation chambers for receiving a portion of the hot and cold water therein, and a temperature-dependent control means supported on said disk packet means and coupled to said control disk for directly receiving said mixture of water from said mixing chamber, for determining the temperature of the mixture of water in said mixing chamber upon receipt thereof and for selectively adjusting the position of said control disk to regulate the temperature of mixed water emerging from said water outlet at a predetermined temperature, said control disk including a cavity in communication with said first mixing chamber, said temperature-dependent control means being positioned in said cavity.

10. A sanitary mixing valve for controlling the flow and mix of hot and cold water supplied respectively from a hot water inlet and a cold water inlet, comprising a valve body coupleable to said hot and cold water inlets and having a water outlet, a stationary valve seat disk supported on said valve body, disk packet means supported on said valve seat disk for controlling the flow and temperature of water emerging from said water outlet, said disk packet means including a lower guide disk, an upper guide disk and a control disk disposed intermediate said lower and upper guide disks, said lower guide disk having at least first and second passages in communication with said hot and cold water inlets through said stationary valve seat disk, said control disk having corresponding third and fourth passages selectively displaceable to communicate with the first and second passages in said lower guide disk, said upper guide disk having a corresponding first set of pressure compensation chambers in communication with said third and fourth passages in said control disk, said control disk including a first mixing chamber in communication with at least one of said third and fourth passages and said pressure compensation chambers for receiving a portion of the hot and cold water therein, and a temperature-dependent control means supported on said disk packet means and coupled to said control disk for directly receiving said mixture of water from said mixing chamber, for determining the temperature of the mixture of water in said mixing chamber upon receipt thereof and for selectively adjusting the position of said control disk to regulate the temperature of mixed water emerging from said water outlet at a predetermined temperature, said first mixing chamber being in communication with said first and second passages in said lower guide disk, said control disk further including a second mixing chamber in communication with said pressure compensation chambers in said upper guide disk, said control disk further including a cavity coupling said first mixing chamber to said second mixing chamber, said temperature-dependent control means being positioned in one of said first mixing chamber, said second mixing chamber and said cavity.

11. The sanitary mixing valve as claimed in claim 10, wherein a textile material is inserted in said second mixing chamber to better mix the hot and cold water and reduce noise.

12. A sanitary mixing valve for controlling the flow and mix of hot and cold water supplied respectively from a hot water inlet and a cold water inlet, comprising a valve body coupleable to said hot and cold water inlets and having a water outlet, a stationary valve seat disk supported on said valve body, disk packet means supported on said valve seat disk for controlling the flow and temperature of water emerging from said water outlet, said disk packet means including a lower guide disk, an upper guide disk and a control disk disposed intermediate said lower and upper guide disks, said lower guide disk having at least first and second passages in communication with said hot and cold water inlets through said stationary valve seat disk, said control disk having corresponding third and fourth passages selectively displaceable to communicate with the first and second passages in said lower guide disk, said upper guide disk having a corresponding first set of pressure compensation chambers in communication with said third and fourth passages in said control disk, said control disk including a first mixing chamber in communication with at least one of said third and fourth passages and said pressure compensation chambers for receiving a portion of the hot and cold water therein, and a temperature-dependent control means supported on said disk packet means and coupled to said control disk for directly receiving said mixture of water from said mixing chamber, for determining the temperature of the mixture of water in said mixing chamber upon receipt thereof and for selectively adjusting the position of said control disk to regulate the temperature of mixed water emerging from said water outlet at a predetermined temperature, a textile material being inserted in said first mixing chamber to better mix the hot and cold water and reduce noise.

13. A sanitary mixing valve for controlling the flow and mix of hot and cold water supplied respectively from a hot water inlet and a cold water inlet, comprising a valve body coupleable to said hot and cold water inlets and having a water outlet, a stationary valve seat disk supported on said valve body, disk packet means supported on said valve seat disk for controlling the flow and temperature of water emerging from said water outlet, said disk packet means including a lower guide disk, an upper guide disk and a control disk disposed intermediate said lower and upper guide disks, said lower guide disk having at least first and second passages in communication with said hot and cold water inlets through said stationary valve seat disk, said control disk having corresponding third and fourth passages selectively displaceable to communicate with the first and second passages in said lower guide disk, said upper guide disk having a corresponding first set of pressure compensation chambers in communication with said third and fourth passages in said control disk, said control disk including a first mixing chamber in communication with at least one of said third and fourth passages and said pressure compensation chambers for receiving a portion of the hot and cold water therein, and a temperature-dependent control means supported on said disk packet means and coupled to said control disk for directly receiving said mixture of water from said mixing chamber, for determining the temperature of the mixture of water in said mixing chamber upon receipt thereof and for selectively adjusting the position of said control disk to regulate the temperature of mixed water emerging from said water outlet at a predetermined temperature, said lower guide disk further including fifth and sixth passages and said control disk includes seventh and eighth passages, said first and fifth passages of said lower guide disk and said third and seventh passages of said control disk being in communication with said hot water inlet, said second and sixth passages of said lower guide disk and said fourth and eighth passages of said control disk being in communication with said cold water inlet.

14. The sanitary mixing valve as claimed in claim 13, wherein said lower guide disk includes a first inlet slit associated with said hot water inlet and a second inlet slit associated with said cold water inlet, said first inlet slit directing water from said hot water inlet to said first passage in said lower guide disk, said second inlet slit directing water from said cold water inlet to said second passage in said lower guide disk.

15. The sanitary mixing valve as claimed in claim 14, wherein said first inlet slit directs water from said hot water inlet to said fifth passage in said lower guide disk, said second inlet slit directing water from said cold water inlet to said sixth passage in said lower guide disk.

16. A sanitary mixing valve for controlling the flow and mix of hot and cold water supplied respectively from a hot water inlet and a cold water inlet, comprising a valve body coupleable to said hot and cold water inlets and having a water outlet, a stationary valve seat disk supported on said valve body, disk packet means supported on said valve seat disk for controlling the flow and temperature of water emerging from said water outlet, said disk packet means including a lower guide disk, an upper guide disk and a control disk disposed intermediate said lower and upper guide disks, said lower guide disk having at least first and second passages in communication with said hot and cold water inlets through said stationary valve seat disk, said control disk having corresponding third and fourth passages selectively displaceable to communicate with the first and second passages in said lower guide disk, said upper guide disk having a corresponding first set of pressure compensation chambers in communication with said third and fourth passages in said control disk, said control disk including a first mixing chamber in communication with at least one of said third and fourth passages and said pressure compensation chambers for receiving a portion of the hot and cold water therein, and a temperature-dependent control means supported on said disk packet means and coupled to said control disk for directly receiving said mixture of water from said mixing chamber, for determining the temperature of the mixture of water in said mixing chamber upon receipt thereof and for selectively adjusting the position of said control disk to regulate the temperature of mixed water emerging from said water outlet at a predetermined temperature, said first and second passages in said lower guide disk each including an enlarged portion, said enlarged portions being in communication with said first mixing chamber in said control disk.

17. The sanitary mixing valve as claimed in claim 10, wherein said first and second passages in said lower guide disk each include an enlarged portion, said enlarged portions being in communication with said first and second mixing chambers in said control disk.

18. The sanitary mixing valve as claimed in claim 13, wherein said upper guide disk further includes four pressure compensation chambers, each one of said four pressure compensation chambers being associated respectively with one of said third, fourth, seventh and eighth passages in said control disk.

19. A sanitary mixing valve for controlling the flow and mix of hot and cold water supplied respectively from a hot water inlet and a cold water inlet, comprising a valve body coupleable to said hot and cold water inlets and having a water outlet, a stationary valve seat disk supported on said valve body, disk packet means supported on said valve seat disk for controlling the flow and temperature of water emerging from said water outlet, said disk packet means including a lower guide disk, an upper guide disk and a control disk disposed intermediate said lower and upper guide disks, said lower guide disk having at least first and second passages in communication with said hot and cold water inlets through said stationary valve seat disk, said control disk having corresponding third and fourth passages selectively displaceable to communicate with the first and second passages in said lower guide disk, said upper guide disk having a corresponding first set of pressure compensation chambers in communication with said third and fourth passages in said control disk, said control disk including a first mixing chamber in communication with at least one of said third and fourth passages and said pressure compensation chambers for receiving a portion of the hot and cold water therein, and a temperature-dependent control means supported on said disk packet means and coupled to said control disk for directly receiving said mixture of water from said mixing chamber, for determining the temperature of the mixture of water in said mixing chamber upon receipt thereof and for selectively adjusting the position of said control disk to regulate the temperature of mixed water emerging from said water outlet at a predetermined temperature, said disk packet means including a shackle means for holding said disk packet means together.

20. The sanitary mixing valve as claimed in claim 19, wherein said shackle means includes a shackle having two arms, said disk packet means including a return spring, said return spring, temperature-dependent control means and control disk being clamped between said two arms.

21. The sanitary mixing valve as claimed in claim 20, wherein one of the two arms of the shackle includes an adjustment screw.

* * * * *